United States Patent [19]

Weaver

[11] 4,076,133
[45] Feb. 28, 1978

[54] SILO UNLOADER BLADES

[76] Inventor: Richard L. Weaver, Rte. 4, Myerstown, Pa. 17067

[21] Appl. No.: 635,395

[22] Filed: Nov. 26, 1975

[51] Int. Cl.² .............................................. B65G 65/46
[52] U.S. Cl. ............................................... 214/17 DA
[58] Field of Search .......... 214/17 DA, 17 D, 17 DB; 302/56; 299/87

[56] References Cited

U.S. PATENT DOCUMENTS

| Re. 26,863 | 4/1970 | Weaver et al. | 214/17 DA |
| 3,055,649 | 9/1962 | Dretzke et al. | 214/17 DB |
| 3,254,777 | 6/1966 | Vandusen | 214/17 DB |
| 3,391,809 | 7/1968 | Weaver et al. | 214/17 DA |
| 3,817,409 | 6/1974 | Weaver et al. | 214/17 DA |
| 3,822,796 | 7/1974 | Buschbom | 214/17 DB |

Primary Examiner—Robert G. Sheridan
Attorney, Agent, or Firm—Paul & Paul

[57] ABSTRACT

Blades are provided for an auger type silo unloader, wherein the blades are arranged to function with respect to the silage that is to be unloaded, such that they plow through the silage during normal operation of the silo, rather than cutting the silage. To this end, the blades are oriented to bluntly engage silage, or may even have a leading edge angularly directed forwardly for facilitating the plowing function, rather than being backwardly raked such as would facilitate a cutting function.

3 Claims, 7 Drawing Figures

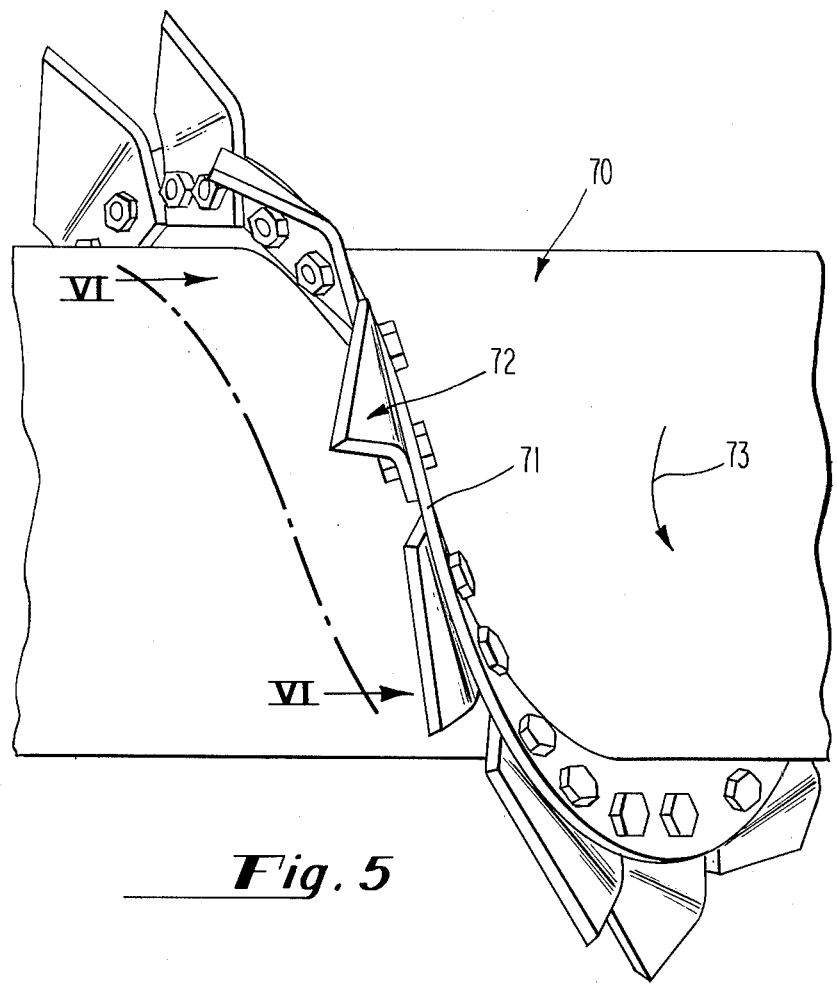
Fig. 5
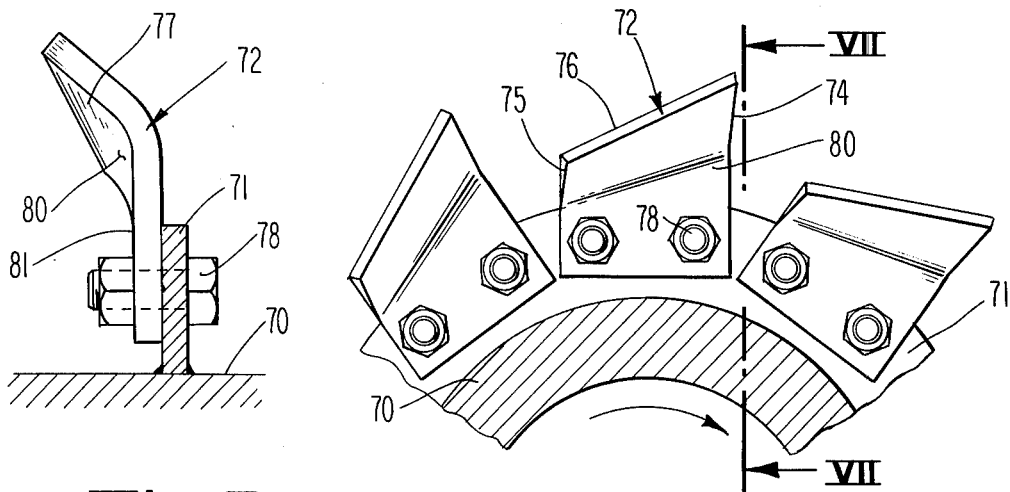
Fig. 7
Fig. 6

SILO UNLOADER BLADES

BACKGROUND OF THE INVENTION

In silos of prior art types, particularly of the type utilizing a bottom unloader of the auger type that functions so as to move or sweep across the floor of a silo about a generally central axis, with the radial auger also being rotated on its own axis to engage compacted silage, loosen it and convey it toward the center of a silo, it has heretofore been known to utilize blades that cut silage and that have backwardly raked cutting edges, as for example, as is indicated in U.S. Pat. No. 3,391,809. In disclosures of the type of that patent and in other disclosures in the art, it is commonplace that the blades on a generally helical auger are arranged such that the cutting edges are backwardly raked with forward portions of the blade as viewed in the direction of rotation of the auger being shorter than rearward portions of that same blade. Each blade would, therefore, engage the silage in such a way as to cut it. Heretofore, it has generally been necessary to sharpen blades periodically as they became dull as caused by wear during operation from repeated engagement with and cutting of silage.

THE PRESENT INVENTION

The present invention is directed toward providing an improvement in auger type unloader blades, whereby a considerably more effective dislodging of silage is provided.

To this end, the auger blades are configured and located on the auger to function in plow-like fashion, such that as viewed in the direction of rotation of an auger about its own axis, an outer portion of the blade will engage silage at about the same time or prior to an inner portion thereof, so as to plow through the silage rather than cutting through it. It has been found that, pursuant to the present invention, it is no longer necessary to sharpen blades, in that sharpening does not add appreciably to the effectiveness of the blades when the blades are used to plow rather than to cut.

It has also been found that by using blades of the plow type in accordance with this invention, fewer blades need be used along the helix of the auger, and the blades may be spaced apart relative to each other. In fact, it has been found that about half the number of blades may be utilized for greater effective silage dislodging than with blades of the cutting type, as for example, as are disclosed in U.S. Pat. No. 3,391,809 and elsewhere.

Accordingly, it is a primary object of this invention to provide a novel blade improvement for bottom silo unloaders of the auger type.

It is a further object of this invention to provide a novel blade for accomplishing the purposes of the object set forth immediately above, wherein the blade is of the plow type.

It is another object of this invention to provide a blade that eliminates the necessity for periodic sharpening.

It is a further object of this invention to provide a blade structure that enables an auger to function effectively with fewer blades.

Other objects and advantages of the present invention will be readily understood by reference to the foregoing description, the brief descriptions of the drawing figures, the detailed descriptions of the preferred embodiments, and the appended claims.

BRIEF DESCRIPTION OF THE DRAWING FIGURES

FIG. 5 is an enlarged fragmentary detailed view of a portion of an auger similar to that illustrated in FIG. 1, but wherein a preferred blade form is illustrated, as is a preferred blade mounting relative to the auger fliting, also illustrated.

FIG. 6 is an enlarged fragmentary view of a few auger teeth in accordance with the present invention, with a view being taken generally along the line VI—VI of FIG. 5.

FIG. 7 is an enlarged vertical sectional view, taken through the auger illustrated in FIG. 6, generally along the line VII—VII of FIG. 6, and wherein an edge view of the leading edge of an auger tooth is clearly illustrated.

DETAILED DESCRIPTION OF THE PREFERRED EMBODIMENTS

Figure 1:
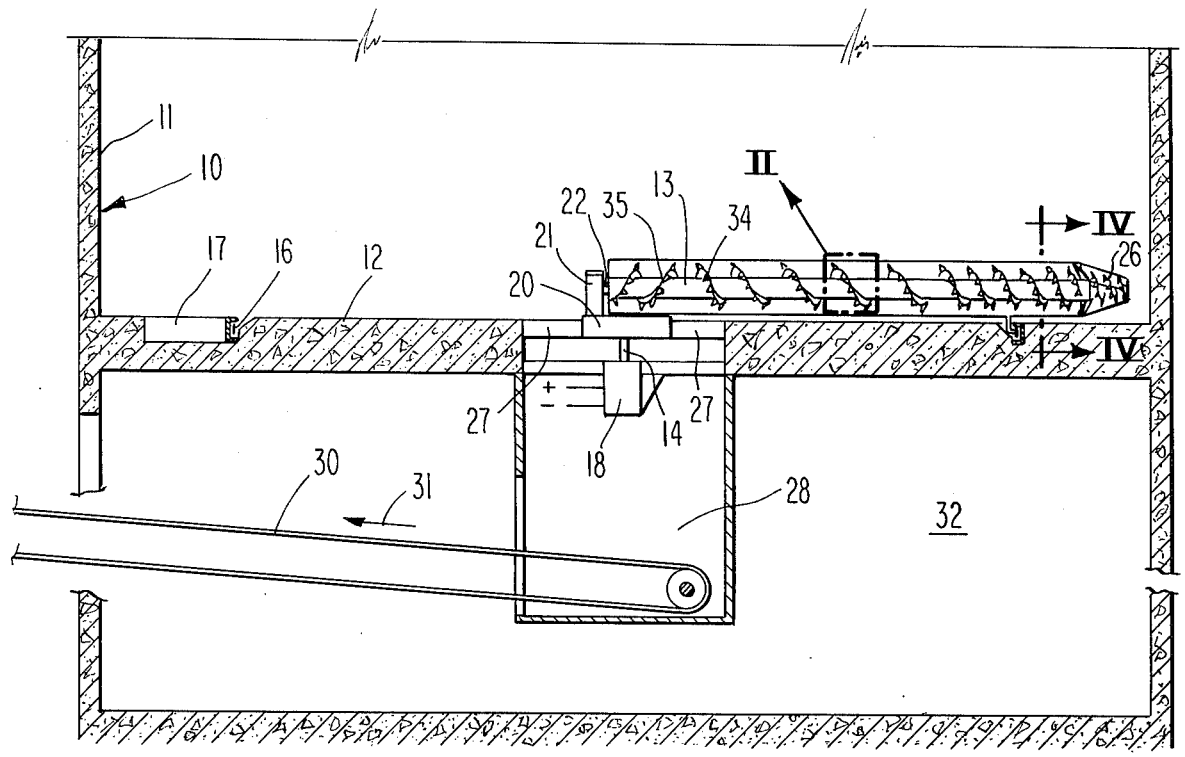
FIG. 1 is a fragmentary vertical sectional view, taken through a silo in accordance with the present invention, and wherein a radial sweep-type auger is illustrated for discharging silage to the center thereof and downwardly into a tunnel therebeneath, wherein the auger embodies teeth in accordance with the present invention.

Refering now to the drawings in detail, reference is first made to FIG. 1, wherein there is illustrated a silo generally designated by the numeral 10, as being of concrete or like construction, having a vertical, generally cylindrical wall 11 and a floor 12.

An auger 13 is radially disposed at the bottom of the silo for movement about a generally vertical axis (not illustrated) running through the shaft 14. The auger is disposed to move across the floor 12 of the bottom of the silo in such a manner, that if viewed in top plan view of FIG. 1, the movement of the auger 13 would be clockwise about the floor of the silo, as indicated by the arrow 15 illustrated in FIG. 4. The auger would be driven by any of various means, but preferably it would be engaged with a band 16 mounted in the floor 12 of the auger, with the band being movable as dictated by a band-moving mechanism mounted at 17, and not specifically a subject matter of the present application. Thus, as the band would move as dictated by its moving mechanism, it would draw the auger across the floor 12 of the silo about a generally central vertical axis.

Figure 4:
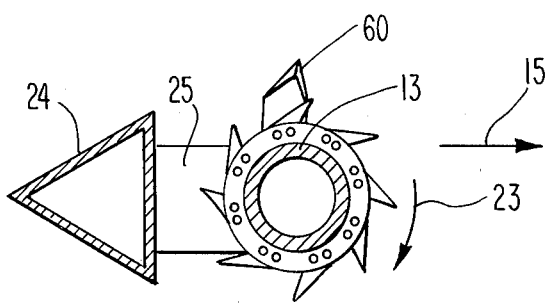
FIG. 4 is an enlarged vertical transverse sectional view taken through the auger and auger back illustrated in FIG. 1, generally along the line IV—IV of FIG. 1.

Means 18 are also provided, for imparting drive through the shafts 14, a transmission device 20, a secondary transmission device 21, and through a shaft 22, for rotating the auger 13 about its own axis, in a direction of movement of the arrow 23 illustrated in FIG. 4, as the auger advances in the direction of the arrow 15. Such would be the normal motion of the auger 13 during its silage dislodging, although provision is also made for reversing the direction of rotation of the auger 13, as well as for reversing direction of advance where it is desired to clear the auger from compacted silage or the like. The drive mechanism 18 may be an electric motor, or any other suitable drive mechanism, for the purposes of the present invention.

The auger 13 is provided with an auger back 24, connected thereto by a connecting member 25 at the outer end, for supporting the outer end of the auger. An auxiliarly auger 26 may be utilized at the outer most end, as desired.

Silage is drawn radially inwardly from the walls 11 of the silo, during the normal operation of the auger, as illustrated in FIG. 4, such that the silage is delivered for discharge through openings 27, into the bottom zone 28 of the discharge, whereby it may be conveyed by a suitable conveyor mechanism 30, outwardly of the silo, as indicated by the arrow 31 in FIG. 1, whereby the silage may be removed from the tunnel 32.

Figure 2:
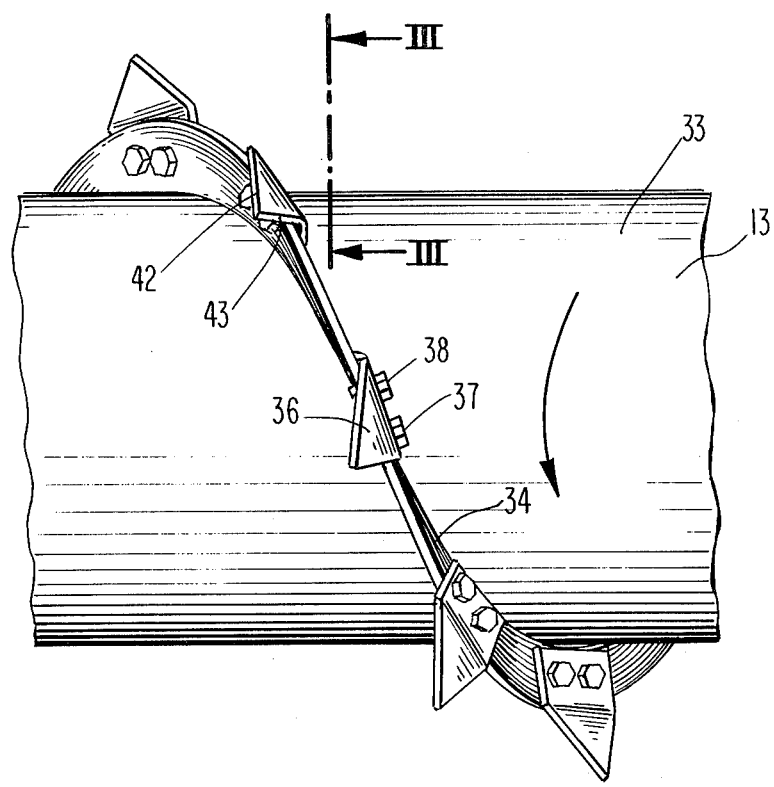
FIG. 2 is an enlarged fragmentary detailed view of a portion of the auger illustrated in FIG. 1, and identified generally by the numeral II.

The auger 13 has a generally cylindrical or pipe-like portion 33, and a generally helically wound mounting band 34 thereon, for facilitating engagement of silage and conveying the same radially inwardly to the zones 27. It will be noted that the radial inner most portion of the auger 13 has reversed fliting 35, to the direction of the fliting 34, to maintain the radial inner most end of the auger 3 clear of silage, and to facilitate discharge of the silage to the passageway zones 27. The fliting or mounting strip 34 is provided with plow blades 36 mounted thereon as illustrated in FIG. 2. It will be noted that the reverse fliting portion 35 also has plow blades 36 mounted thereon, similarly arranged, but directed so as to convey silage in a radial outward direction thereby, otherwise the blades being generally similar to those 36. Accordingly, only the blades 36 will be further described in detail herein.

Figure 3:
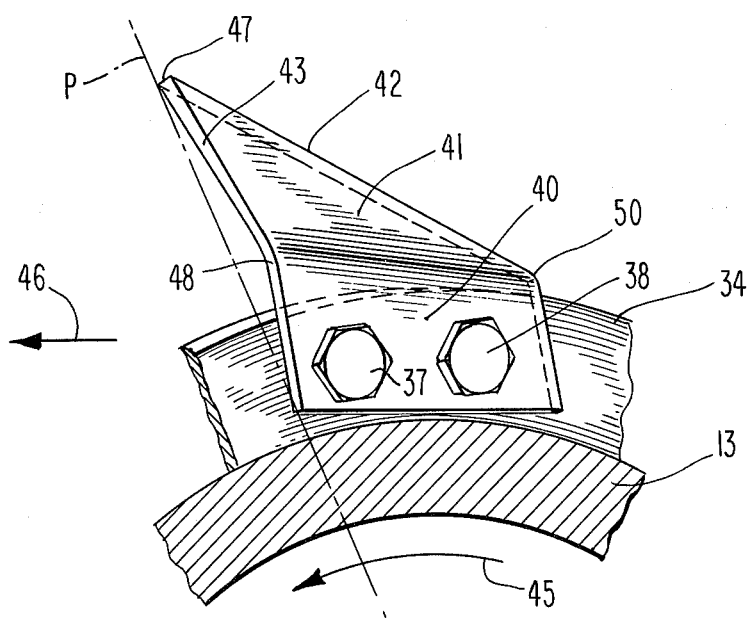
FIG. 3 is an enlarged fragmentary axially directed view of an auger tooth in accordance with the present invention, with the view being taken generally along the line III—III of FIG. 2.

The blades 36 are spaced apart from each other a sufficient amount so as to accommodate the spacing of another complete blade therebetween, as desired, in that fewer blades 36 are necessary along the fliting 34 than with cutting blade arrangements of prior art types. Each of the blades 36 is mounted to the fliting 34 by suitable bolt-type fasteners 37, 38 or the like. It will be noted that each of the blades 36 has a mounting portion 40 disposed against the fliting 34, and an angularly bent working portion 41. The working portion is defined by blade ends 42, 43 that define an acute angle therebetween. Each of the blades 36 is of sheet metal construction, not sharpened along end 43, and preferably of 3/16 inches sheet metal thickness. It will be noted that the end or narrow surface 43 terminates in a leading edge 44 as illustrated in FIG. 3, with due regard for the direction of rotation of the auger 13 as indicated by the arrow 45 in FIG. 3, and with due regard to the direction of advance as indicated by the arrow 46 in FIG. 3. The end or edge 43 extends approximately from its junction 47 with the end or edge 42, to the bend point 48, and the end or edge 42 extends from the point 47 to its bend point 50, almost at the location of the upper end of the mounting helix 34.

With particular reference to FIG. 3, it will be noted that the edge 43 of the blade 41 is forwardly directed, such that its outer most end portion; that near the tip 47 is adapted to engage silage during the rotation of the auger 13, before an inner portion; for example, a portion near the bend point 48 is adapted to engage silage, because the outer portion 47 of the blade edge is more forwardly located with respect to the direction of forward rotation of the auger 13 than is an inner located portion of the edge 43 (that near the bend portion 48). It will be noted that if a plane P were extended longitudinally through the auger 13, as illustrated in FIG. 3, taken through an imaginary line that also intersected the axis of rotation of the auger 13 (not shown), such plane would be intersected by an upper forwardly directed portion of the blade (that portion of the edge 43 that is closest to the point 47 as illustrated in FIG. 3) than a portion of the edge 43 that is located closer to the bend point 48.

It will be noted that the construction, mounting and location of the blade 41, and each of the similar blades in accordance with this invention is directed to perform the intended function; namely of plowing into silage by virtue of the blade tips first engaging and cutting into the silage, rather than cutting at the silage as would be the case with blades of prior art types.

Also, in accordance with the present invention, only a single large cutting blade 60 is needed, as distinguished from prior art types of devices. The large cutting blade 60 is used to keep the bearing (not shown) at the outer end of the auger free of silage, and generally two such blades are needed, mounted approximately 180° apart. However, in accordance with the present invention, by the use of an outwardly bent large blade 60 also, as illustrated in FIG. 4, only a single such blade is needed, because of the greater dislodgement effect of plow blades in accordance with the present invention.

With reference now to a preferred embodiment of the present invention, as illustrated in FIGS. 5 through 7, an auger 70 is illustrated, having helical fliting 71 thereon, and in which a plurality of blades 72 are mounted, closer to one another, as illustrated, than in the previously-discussed embodiment of the present invention. It will be noted that, as the auger 70 rotates on its axis in the direction indicated for the arrow 73 of FIG. 5, blunt edges 74 of the blades 72 are adapted to engage the silage in plow-like fashion, as can be realized from the illustration of FIG. 6, wherein the blades 72 are mounted such that the forward edges 74 thereof present a greater area than the trailing edges 75, and such that the connecting edges 76 form a backward rake as illustrated in FIG. 6. In an embodiment of this type, the forward edges 74 are adapted to bluntly engage silage, rather than gradually severing it, as would be the case if the rake 76 were reversed such that the leading edge was shorter than the trailing edge.

It will further be apparent that the blades 72 are mounted to the left of the fliting 71, as illustrated in FIGS. 5 and 7, such that the upper end 77 of a given blade 72 does not curl over the fliting 71, but curls in a direction away from the fliting 71, and is bolted thereto by means of suitable bolt-type fasteners 78. It will be noted that the upper portion 77 of each blade 72 merges into a curved or bent portion 80 of each blade that in turn merges into a mounting portion 81 thereof, and that a portion of the leading edge 74 extends upwardly above the fliting, prior to merging with the curvature 80, as illustrated in FIG. 6.

It will be noted that in the form of the apparatus illustrated in FIGS. 5 through 7, the plow blade is adapted for maximizing the effectiveness of the leading edge, in not requiring silage to be delivered over the fliting.

It will further be noted that the blades of the present invention, while being designated as plow blades perform a triad of functions; namely plowing, ripping, and tearing, instead of merely performing a principally severing or cutting function as with prior art types of blades.

It will be apparent from the foregoing that various modifications may be made in the details of construction, as well as in the use and operation of the plow-type blades in accordance with the present invention, all within the spirit and scope of the invention as defined in the appended claims.

What is claimed is:

1. In a silo unloader apparatus, wherein an unloader of the auger type is provided for use at the bottom of a silo for bottom discharge of silage therefrom, and wherein the auger is of the radially directed worm type that advances or sweeps across the silo floor about a generally centrally located axis and that rotates in a forward silage-engaging direction about is own axis to bring teeth carried thereby into engagement with silage, the improvement comprising said teeth having blunt leading edges that face in the direction of rotation and are not substantially backwardly raked, so as to be of plow-like construction, wherein said teeth leading edges and adjacent raked edges define acute angular relationships therebetween with the apex of the angular relationship in each instance being located at a forward portion of the associated said tooth.

2. In a silo unloader apparatus, wherein an unloader of the auger type is provided for use at the bottom of a silo for bottom discharge of silage therefrom, and wherein the auger is of the radially directed worm type that advances or sweeps across the silo floor about a generally centrally located axis and that rotates in a forward silage-engaging direction about its own axis to bring teeth carried thereby into engagement with silage, the improvement comprising said teeth having blunt leading edges that face in the direction of rotation and are not substantially backwardly raked, so as to be of plow-like construction, wherein said teeth leading edges and adjacent raked edges define acute angular relationships therebetween with the apex of the angular relationship in each instance being located at a forward portion of the associated said tooth and, wherein said teeth are each curved at their outer ends in a direction away from an associated auger fliting surface on which they are mounted.

3. In a silo unloader apparatus, wherein an unloader of the auger type is provided for use at the bottom of a silo for bottom discharge of silage therefrom, and wherein the auger is of the radially directed worm type that advances or sweeps across the silo floor about a generally centrally located axis and that rotates in a forward silage-engaging direction about its own axis to bring teeth carried thereby into engagement with silage, the improvement comprising, said teeth comprising blunt leading edges having outer edge portions farther away from the axis of auger rotation that are located relative to inner tooth edge portions closer to the axis of auger rotation, such that, in a forward silage-engaging direction of rotation of the auger, the outer tooth edge portions are located to move through an imaginary plane through the radial axis of rotation of the auger, prior to moving through that plane by inner tooth edge portions of those same teeth, wherein said teeth each have forward and rearward ends that define acute angular relationships therebetween and wherein adjacent teeth are generally helically mounted on said auger in spaced-apart relation relative to each other.

* * * * *